Patented Jan. 8, 1952

2,581,911

UNITED STATES PATENT OFFICE 2,581,911

ACRYLONITRILE-BUTADIENE-1,3 COPOLYMERS STABILIZED BY ANTIMONYL PYROGALLOLATE

Harry E. Albert and George E. P. Smith, Jr., Akron, Ohio, assignors to The Firestone Tire & Rubber Company, Akron, Ohio, a corporation of Ohio No Drawing. Original application March 30, 1949, Serial No. 84,493. Divided and this application May 29, 1951, Serial No. 229,532

2 Claims. (Cl. 260—45.75)

Instant application is a divisional application of Serial No. 84,493, filed March 30, 1949. This invention relates to the stabilization of the rubber-like copolymers of 1,3-butadiene or other conjugated-diene monomer with a vinyl monomer, e. g., acrylonitrile, methacrylonitrile, alpha chloroacrylonitrile, propacrylonitrile, acrylamide, esters of acrylic acid and its homologues which contain one to five carbons in the ester group, etc. The stabilizer used is an antimonyl derivative of pyrogallal in which the hydrogens of the two ortho-hydroxy groups are replaced by antimony. The invention includes the stabilized polymerizates, both cured and uncured, and the process of stabilization. A particular application of the invention is in the stabilization of rubber compounds which are white or pastel shades—for example, the white sidewalls of tires, etc.—because the stabilizer of this invention does not discolor.

Difficulty has been experienced in finding a satisfactory non-discoloring stabilizer for synthetic rubbers. Phenyl-beta-naphthylamine, which is the most widely used stabilizer for GR–S, discolors badly.

The stabilizer of this invention may be represented as follows:

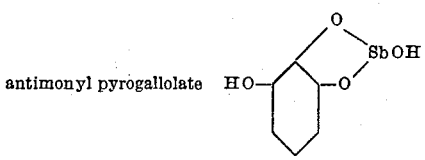

antimonyl pyrogallolate

*Stabilization of Buna N-type synthetic rubbers*

Various tests are given below on different Buna N compounds showing the effect of the stabilizer of this invention and comparing the stabilizer of this invention with phenyl-beta-naphthylamine, the most widely used commercial product. Each of the stabilized compounds referred to was obtained by adding 2 parts of the stabilizer per 100 parts of copolymer to the latex resulting from emulsion copolymerization of acrylonitrile and 1,3-butadiene. The latex was then coagulated and dried, and the samples for tests on the vulcanizate were prepared by vulcanization of such dried coagulum. The hand tests given in the following table were made by pulling and feeling the copolymer to detect any stiffening or softening or other sign of deterioration.

The commercial stabilizers discolor Buna N-type rubbers badly, particularly on exposure to ultraviolet light. Most of the tests recorded, therefore, refer to change in color of the products and compare the color and color change with a control or blank. Table I refers to tests conducted on a copolymer obtained by copolymerization of 62 per cent butadiene and 32 per cent acrylonitrile.

TABLE I

*Copolymer stabilization*

| Stabilizer | After Drying at 75° C. | | After Heat-aging 2 days at 90° C. | |
|---|---|---|---|---|
| | Color | Hand Test | Color | Hand Test |
| antimonyl pyrogallolate | gray | no deterioration. | gray | good condition. |
| phenyl-beta-naphthylamine. | brown | ....do...... | brown | Do. |

The above data show the antimonyl pyrogallolate to be as good as phenyl-beta-naphthylamine from the standpoint of preservation of plasticity and better from the standpoint of preservation of color.

The formulae given are illustrative. Different copolymers may be used, and with different compounding ingredients and different amounts of the stabilizer. In general it may be said that 0.1 to 10.0 parts of stabilizer on 100 parts of copolymer, more or less, will give satisfactory results.

What we claim is:

1. A method of retarding the deterioration of acrylonitrile-butadiene-1,3 copolymers which comprises incorporating therein a small amount of antimonyl pyrogallolate.

2. A composition comprising acrylonitrile-butadiene-1,3 copolymer and a small amount of antimonyl pyrogallolate.

HARRY E. ALBERT.
GEORGE E. P. SMITH, JR.

REFERENCES CITED

The following references are of record in the file of this patent:

UNITED STATES PATENTS

| Number | Name | Date |
|---|---|---|
| 2,488,975 | Hunter | Nov. 22, 1949 |